(12) United States Patent
Chu et al.

(10) Patent No.: US 11,703,992 B2
(45) Date of Patent: Jul. 18, 2023

(54) METHOD OF IDENTIFYING FLANGE SPECIFICATION BASED ON AUGMENTED REALITY INTERFACE

(71) Applicant: National Tsing Hua University, Hsinchu (TW)

(72) Inventors: Chih-Hsing Chu, Hsinchu (TW); Mu-Hsuan Lee, Hsinchu (TW); Yen-Ru Chen, Hsinchu (TW); Shau-Min Chen, Toufen (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 6 days.

(21) Appl. No.: 17/218,838

(22) Filed: Mar. 31, 2021

(65) Prior Publication Data
US 2022/0179541 A1 Jun. 9, 2022

(30) Foreign Application Priority Data
Dec. 7, 2020 (TW) .................................. 109143055

(51) Int. Cl.
*G06F 3/04815* (2022.01)
*G06F 3/04842* (2022.01)
(Continued)

(52) U.S. Cl.
CPC .......... *G06F 3/04815* (2013.01); *G06F 3/012* (2013.01); *G06F 3/013* (2013.01);
(Continued)

(58) Field of Classification Search
CPC ...... G06F 3/012; G06F 3/013; G06F 3/04815; G06F 3/04842; G06F 3/04845; G06T 7/62; G06T 17/00; G06T 19/006; H04N 5/2322
See application file for complete search history.

(56) References Cited

U.S. PATENT DOCUMENTS 5,726,688 A * 3/1998 Siefert ................ G06F 3/04895
715/840
8,860,760 B2 10/2014 Chen et al.
(Continued)

FOREIGN PATENT DOCUMENTS

| CN | 110687120 A | 1/2020 |
|---|---|---|
| TW | I651661 B | 2/2019 |
| TW | 202025011 A | 7/2020 |

*Primary Examiner* — Kavita Stanley
*Assistant Examiner* — William Wong
(74) *Attorney, Agent, or Firm* — Muncy, Geissler, Olds & Lowe, P.C.

(57) ABSTRACT

A method of identifying a flange specification based on an augmented reality interface includes steps of: providing a first interface, through which an operator picks real-time images of a flange at different viewing angles, and creating a virtual flange surface according to the real-time images; providing a second interface, through which the operator picks three circumferential points corresponding to the flange, and creating a virtual flange model having a virtual outer diameter; providing a third interface, through which the operator adjusts a virtual pitch circle diameter of the virtual flange model; providing a fourth interface, through which the operator adjusts a virtual thickness of the virtual flange model; providing a fifth interface, through which the operator inputs a count of bolts; and searching a database according to the virtual outer diameter, the virtual pitch circle diameter and the virtual thickness of the virtual flange model to obtain searched results.

15 Claims, 15 Drawing Sheets

(51) Int. Cl.
*G06T 7/62* (2017.01)
*G06F 3/04845* (2022.01)
*G06T 17/00* (2006.01)
*H04N 5/232* (2006.01)
*G06F 3/01* (2006.01)
*G06T 19/00* (2011.01)

(52) U.S. Cl.
CPC ...... *G06F 3/04842* (2013.01); *G06F 3/04845* (2013.01); *G06T 7/62* (2017.01); *G06T 17/00* (2013.01); *G06T 19/006* (2013.01); *H04N 5/23222* (2013.01)

(56) References Cited

U.S. PATENT DOCUMENTS

| | | | | |
|---|---|---|---|---|
| 2002/0054158 | A1* | 5/2002 | Asami | G06T 11/206 715/838 |
| 2011/0054486 | A1* | 3/2011 | Linder-Ganz | A61F 2/08 606/86 R |
| 2011/0167372 | A1* | 7/2011 | Iwai | G06F 30/00 715/771 |
| 2012/0323726 | A1* | 12/2012 | Wilson | G06F 3/04817 705/26.7 |
| 2016/0260250 | A1* | 9/2016 | Jovanovic | H04N 13/246 |
| 2019/0042667 | A1* | 2/2019 | Amadon | G06N 20/00 |
| 2020/0327670 | A1* | 10/2020 | Connor | G06T 7/62 |
| 2020/0357132 | A1* | 11/2020 | Jovanovic | G06T 7/80 |

* cited by examiner

METHOD OF IDENTIFYING FLANGE SPECIFICATION BASED ON AUGMENTED REALITY INTERFACE

CROSS-REFERENCE TO RELATED APPLICATIONS

This application claims priority of No. 109143055 filed in Taiwan R.O.C. on Dec. 7, 2020 under 35 USC 119, the entire content of which is hereby incorporated by reference.

BACKGROUND OF THE INVENTION

Field of the Invention

This disclosure relates to a method of identifying a flange specification, and more particularly to a method of identifying a flange specification based on an augmented reality interface.

Description of the Related Art

A flange is an element used in a fluid delivery apparatus to connect a valve to a fluid pipeline, and is frequently used in semiconductor, chemical and electronic industries, and fields of hospital and living water and gas. Under the influence of protectionism, the standard specifications of the flanges in various countries differ from one another, and the main standard specifications may be classified into Japanese Industrial Standards (JIS), European Union Standards, American National Standards Institute (ANSI) Standards, Australia Standards (AS) and International Organization for Standardization (ISO) Standards. The flanges with different standards of specifications are not compatible with one another. Thus, when the valve is to be replaced or the apparatus is to be inspected and repaired, the specification of the flange needs to be determined so that the subsequent operations for ordering, replacing, testing and resuming can be performed.

The specification of an old flange may not identified from the appearance of the flange because the flange is oxidized or worn out. Alternatively, when the detailed specification of the flange has not been recorded, the maintenance man needs to disassemble the flange from the pipeline and measure the dimensions of the flange by a measurement tool to obtain the correct specification of the flange. Then, the old flange is replaced with a new flange, which needs to be ordered and delivered. If the flange is not disassembled, some portions of the flange may be occluded, and the dimensional parameters of the flange cannot be correctly obtained. The current working flow causes two work stoppages in the overall pipeline, wherein the first stoppage is caused by the flange specification measurement, and the second stoppage is caused by the actual replacement. For the technology factory or hospital having the uninterrupted fluid requirements, each work stoppage causes considerable losses or even the public safety hazards.

Taiwan Patent No. TWI651661 disclosed a computer program product for identifying a flange specification. The computer program product is loaded into and executed by a computer, and includes data reading instructions for reading flange data, and data analyzing instructions for comparing the flange data with the standard reference data of the flanges to obtain analyzed data of the flange specification, wherein the flange data comprises first to third flange dimension data relating to specific data of the flange specification. Although TWI651661 can identify the flange specification, the user needs to manually measure and input data in an unsmooth manner. Although TWI651661 mentioned that depth images based on the computer vision technology can be processed, no details thereof were described. Thus, the prior art still needs to be improved to enhance the smoothness in use.

BRIEF SUMMARY OF THE INVENTION

It is therefore an objective of this disclosure to provide a method of identifying a flange specification based on an augmented reality (AR) interface to allow an on-site operator to operate a handheld electronic device to identify a specification of a horizontally or vertically mounted flange without disassembling the flange, so that the maintenance and replacement of the flange can be facilitated.

To achieve the above-identified object, this disclosure provides a method of identifying a flange specification based on an AR interface applied to an electronic device. The method includes: an environment depth creating step of providing a first interface representing each of real-time images of a flange to allow an operator to pick the real-time images of the flange to be processed at different viewing angles through the first interface, obtaining multiple sets of plane feature point information according to the real-time images, and creating a virtual flange surface according to the multiple sets of plane feature point information; a circumferential point picking step of providing a second interface, on which the virtual flange surface and each of the real-time images are superimposed, to allow the operator to pick three circumferential points corresponding to the flange through the second interface, determining a virtual outer diameter according to the three circumferential points, and creating a virtual flange model having the virtual outer diameter and a virtual pitch circle diameter; a pitch-circle-diameter adjusting step of providing a third interface, on which the virtual flange model and each of the real-time images are superimposed, to allow the operator to adjust the virtual pitch circle diameter of the virtual flange model through the third interface; a flange thickness adjusting step of providing a fourth interface, on which the virtual flange model and each of the real-time images are superimposed, to allow the operator to adjust a virtual thickness of the virtual flange model through the fourth interface; a bolt count inputting step of providing a fifth interface, through which the operator inputs a count of bolts; and a searching step of searching a database according to the virtual outer diameter, the virtual pitch circle diameter and the virtual thickness of the virtual flange model, and obtaining one or multiple searched results of physical flanges matching with the virtual flange model.

With the above-mentioned embodiment, the AR interface can be used in conjunction with human spatial reasoning to provide the instructional information after image processing to determine three dimensional parameters including an outer diameter, a pitch circle diameter and a thickness of the flange. Then, database searching is automatically performed according to the parameters to find the matched specifications of the flanges without the steps of disassembling and measuring the flange.

Further scope of the applicability of this disclosure will become apparent from the detailed description given hereinafter. However, it should be understood that the detailed description and specific examples, while indicating preferred embodiments of this disclosure, are given by way of illustration only, since various changes and modifications within the spirit and scope of this disclosure will become apparent to those skilled in the art from this detailed description.

DETAILED DESCRIPTION OF THE INVENTION

Figure 1:
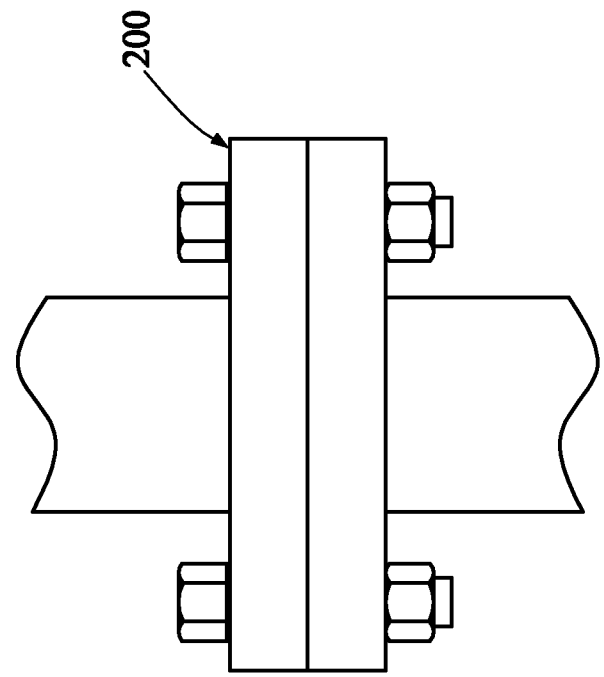
FIG. 1 is a schematic view showing an application of an identifying method according to a preferred embodiment of this disclosure.
Figure 1:
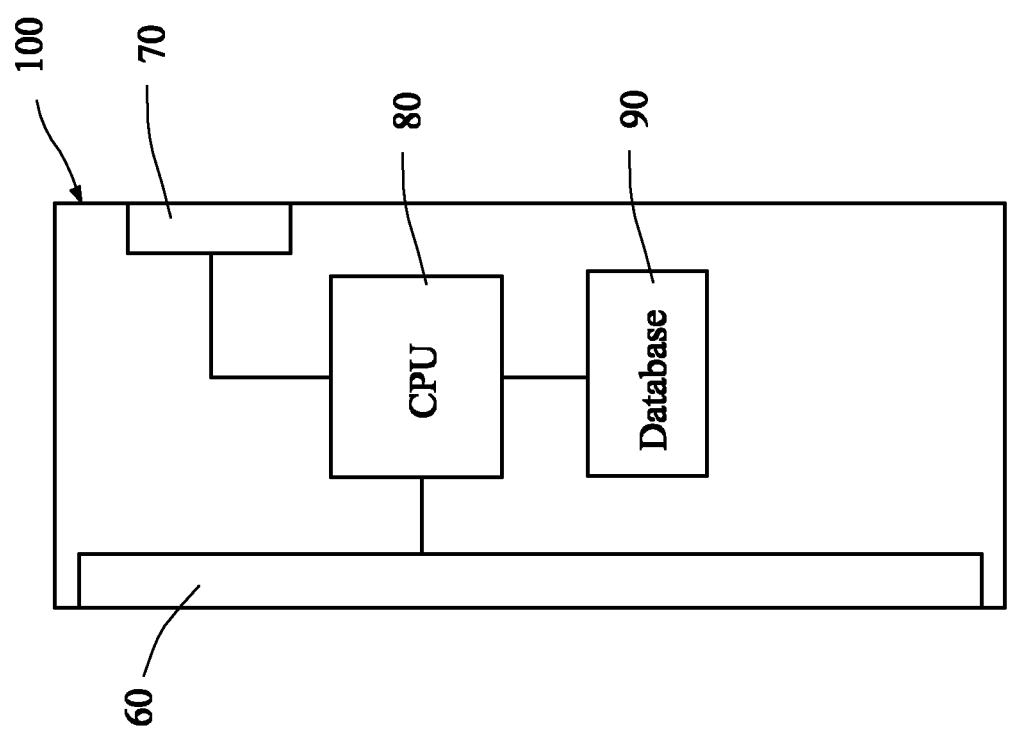

In this disclosure, an augmented reality (AR) interface is utilized to identify the flange specification without disassembling the apparatus and pipeline and without the first work stoppage, and the cost loss caused thereby can be eliminated. In a semiconductor wafer factory, for example, the water resource is extremely important to its production quality. In the manufacturing processes, pure water is needed to clean acid-cleaned wafers, organically cleaned wafers, photolithographed and developed wafers, and mechanically polished wafers. If the production capacity is affected by the water outage, either the semiconductor manufacturer or its downstream provider will encounter additional cost losses.

Technologies based on machine vision to identify dimensions have been developed for many years, but most of them analyze one single image captured at a fixed viewing angle. Because the flanges are usually mounted on the wall, under the floor or on the ceiling, it is not practical to set up and calibrate the foot stand and the camera. In addition, occlusions tend to occur between the flange and the pipeline, or between the flange and other devices, and the proper image cannot be easily obtained. Therefore, it is necessary to provide a simple mobile measurement method for high mobility tasks without being restricted by the working field.

The AR interaction interfaces provide the following advantages. First, the required pre-works can be reduced, and the user only needs several seconds of time to create the quite accurate spatial depth information through the intelligent application program identifying environment. In addition, there is no need to set up or calibrate the camera, and the operation time is significantly shortened. Furthermore, for some flanges fixedly mounted to the pipeline or apparatus in the actual working field, the dimensions of the flanges cannot be effectively identified according to the conventional machine vision because the flanges may be partially occluded. In this case, the operations in the pipeline need to be stopped, and the flange needs to be removed and measured to obtain the dimensions and then to determine the specification thereof. In contract, this disclosure can work with the user's spatial reasoning through the tips of the intelligent virtual information to rapidly identify the flange specification without disassembling the flange. According to the previous researches, the prior art needs five parameters, including the outer diameter, the pitch circle diameter, the thickness, the bolt count and the diameter of the bolt hole, to identify the flange specification. In this disclosure, however, the flange specification can be identified according to only four essential parameters, including the outer diameter, the pitch circle diameter, the thickness and the bolt count through the database analysis. The pitch circle diameter represents the diameter of the pitch circle, and the bolt holes of the flange are located on the pitch circle.

In the practical application, the flanges are paired and respectively mounted on the ends of the pipelines or valves, and the two flanges are fastened together by screws or bolts to connect two pipelines or connect one pipeline to one valve. The pipelines may be classified into horizontal and vertical pipelines, and the flange is perpendicularly mounted to either the horizontal or vertical pipeline, and the pipeline passes through the circular hole of the flange. Thus, the technology of this disclosure is also applicable to the horizontal and vertical pipelines.

Figure 2:
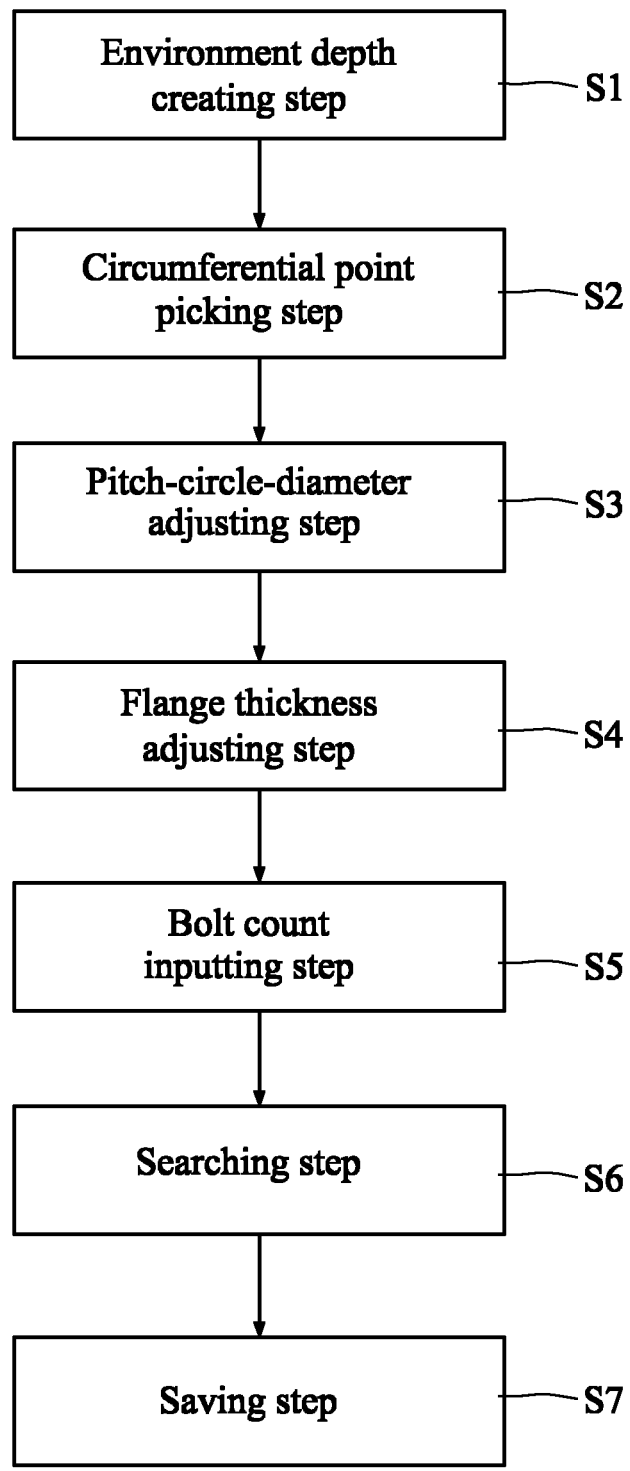
FIG. 2 is a flow chart showing the identifying method according to the preferred embodiment of this disclosure.

FIG. 1 is a schematic view showing an application of an identifying method according to a preferred embodiment of this disclosure. FIG. 2 is a flow chart showing the identifying method according to the preferred embodiment of this disclosure. Referring to FIGS. 1 and 2, the method of identifying a flange specification based on an AR interface may be applied to an electronic device 100, such as a mobile phone, a tablet computer or a wearable device, including a central processing unit (CPU) 80 and a display 60, a camera 70 and a database 90 electrically connected to the CPU 80. Of course, the database may also be a cloud database, and the electronic device 100 performs the search in the cloud through the network. The electronic device 100 executes an application program to perform the identifying method. The identifying method includes an environment depth creating step S1, a circumferential point picking step S2, a pitch-circle-diameter adjusting step S3, a flange thickness adjusting step S4, a bolt count inputting step S5 and a searching step S6. Of course, in order to enhance the database, the identifying method may further include a saving step S7.

Figure 3:
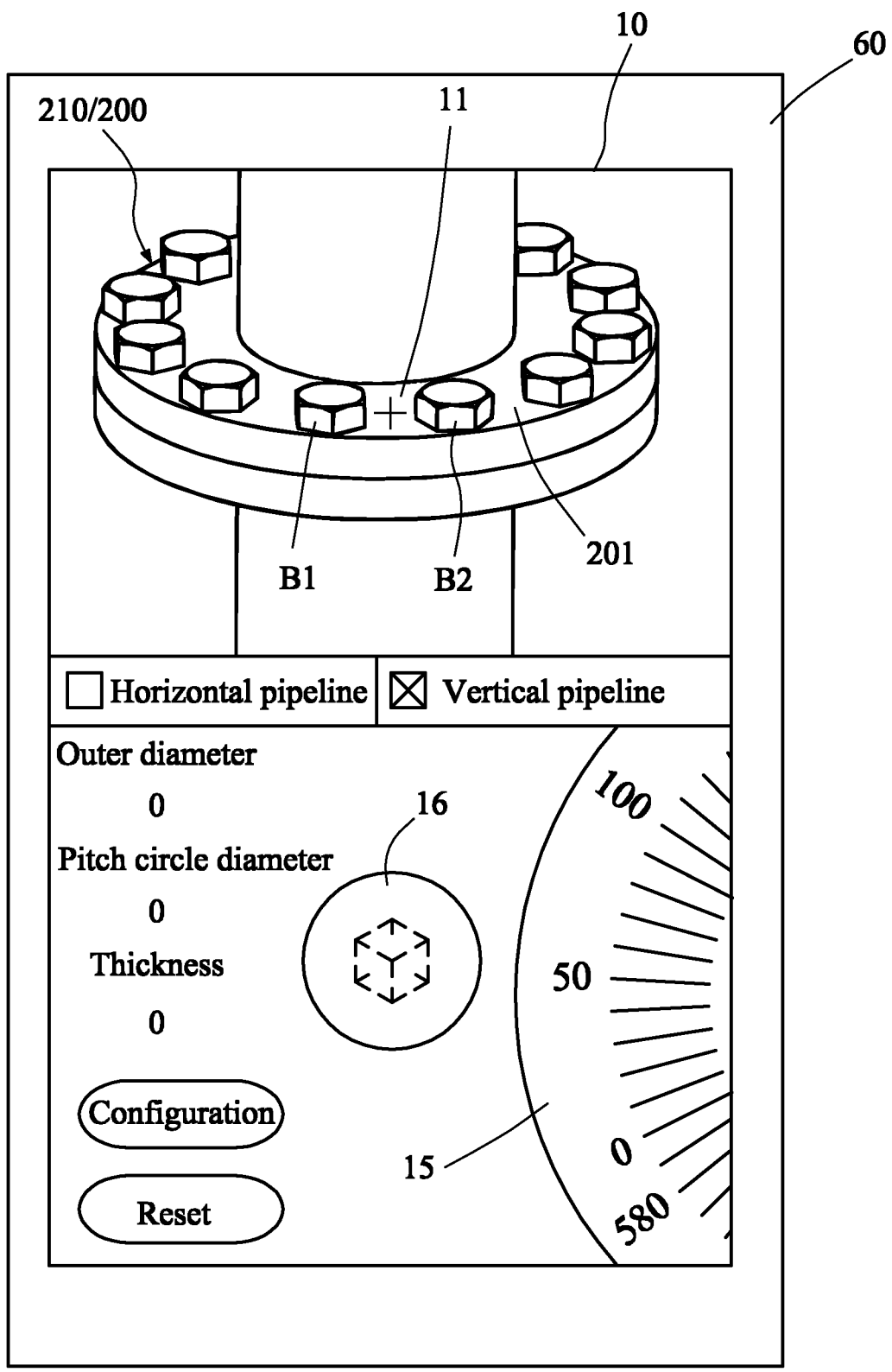
FIGS. 3 to 14 are schematic views showing interfaces providing by the identifying method of FIG. 2.

In the environment depth creating step S1, as shown in FIG. 3, the camera 70 is enabled to perform instant photographing, and a first interface 10 having each of real-time images 210 representing a flange 200 is provided on the display 60. Thus, an operator is able to pick the real-time images 210 of the to-be-processed flange 200 (e.g., three real-time images 210 shown in FIGS. 4 to 6) at different viewing angles through the first interface 10. Therefore, the CPU 80 is capable of obtaining multiple sets of plane feature point information according to the real-time images 210, and creating a virtual flange surface VFS according to the multiple sets of plane feature point information, as shown in FIG. 7.

In a non-restrictive example, as shown in FIG. 3, an upper half portion of the first interface 10 provides the real-time image 210 and a first center mark 11, and a middle portion of the first interface 10 also provides a horizontal pipeline option and a vertical pipeline option to be clicked or checked by the operator (the vertical pipeline in this example). A lower half portion of the first interface 10 also provides information, such as the outer diameter, the pitch circle diameter, the thickness and the like, and also provides a configuration button, a reset button, a scroll wheel 15 and an execution button 16. The first interface 10 may provide messages (e.g., a cross mark representative of the center) to guide the operator to keep the first center mark 11 at a position between two bolts B1 and B2. Alternatively, the electronic device 100 may guide the operator to perform any operation mentioned hereinabove or hereinbelow through a speaker (not shown). In addition, the first interface 10 may also guide the operator to operate the electronic device 100 to photograph the flange 200 while moving the electronic device 100 around the flange 200 in three orientations (e.g., the small icon on the execution button 16) to obtain the real-time images 210 at the different viewing angles. The three orientations include the upward, rightward and leftward orientations. Alternatively, the first center mark 11 of the first interface 10 is able to guide the operator to keep the first center mark 11 on a top surface 201 of the flange 200 to obtain the real-time images 210 at the different viewing angles while the electronic device 100 is being moved around the flange 200 in the three orientations. The virtual flange surface VFS and the top surface 201 are located on substantially the same plane.

Figure 4:
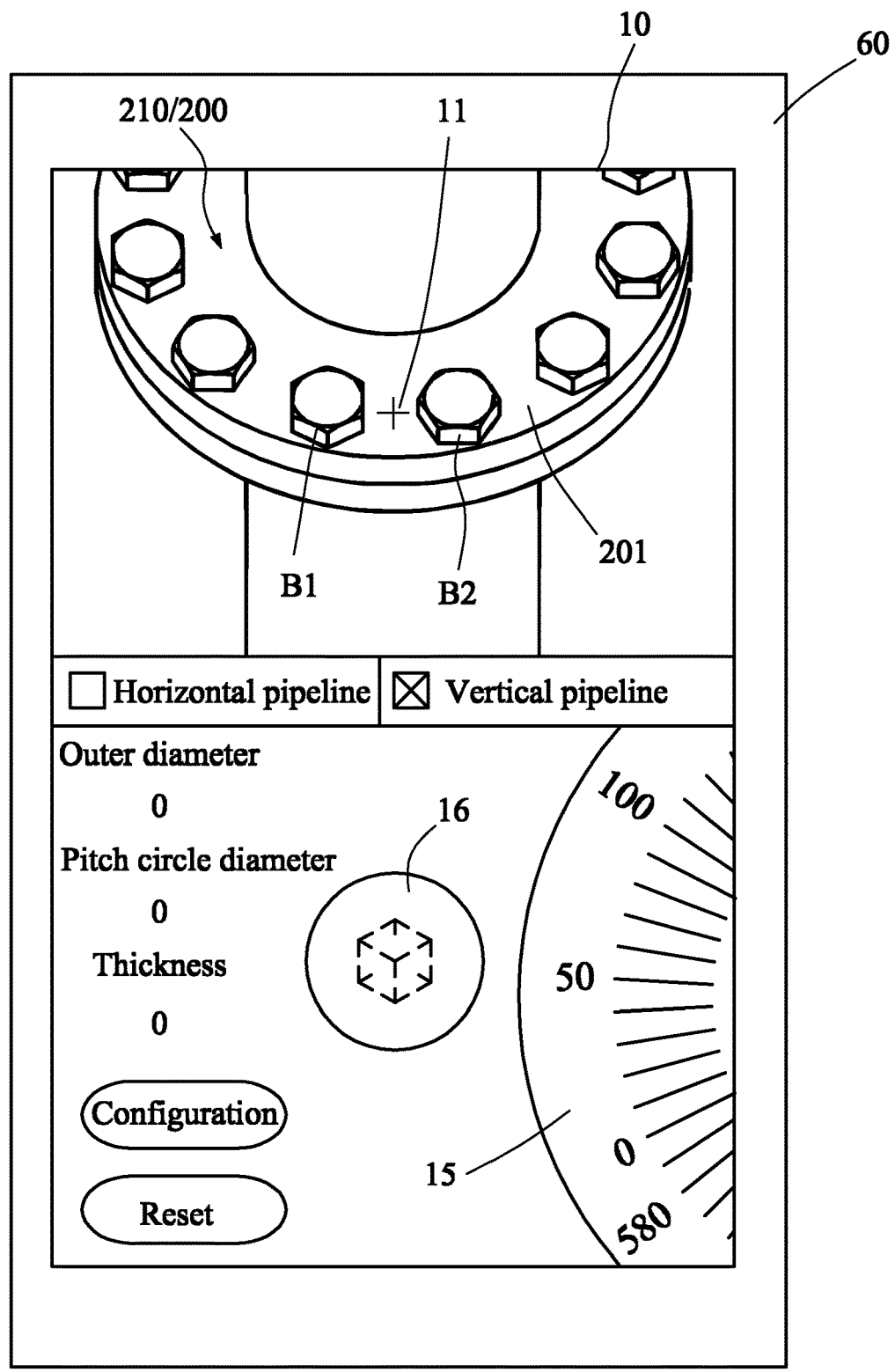
Figure 5:
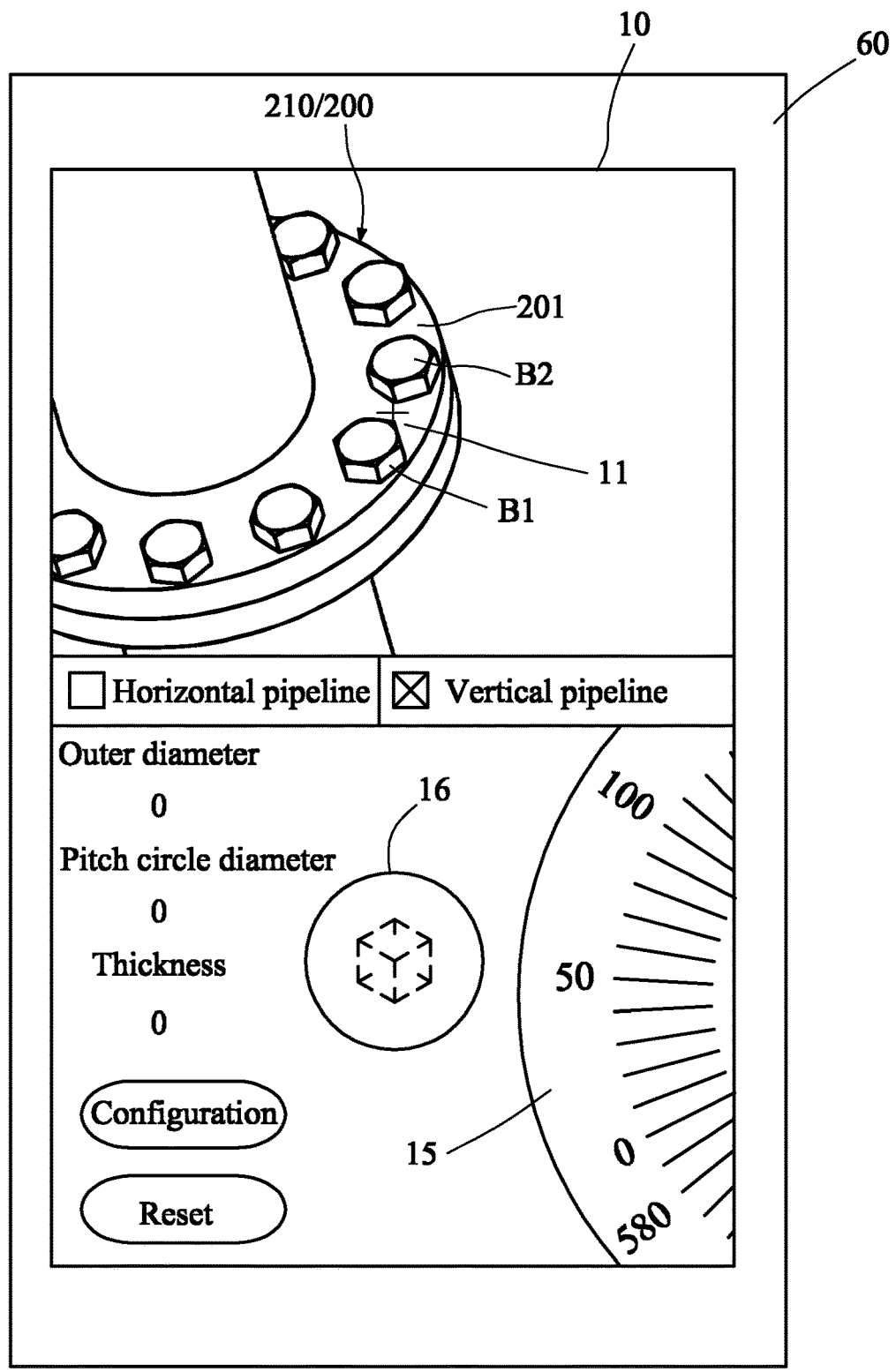
Figure 6:
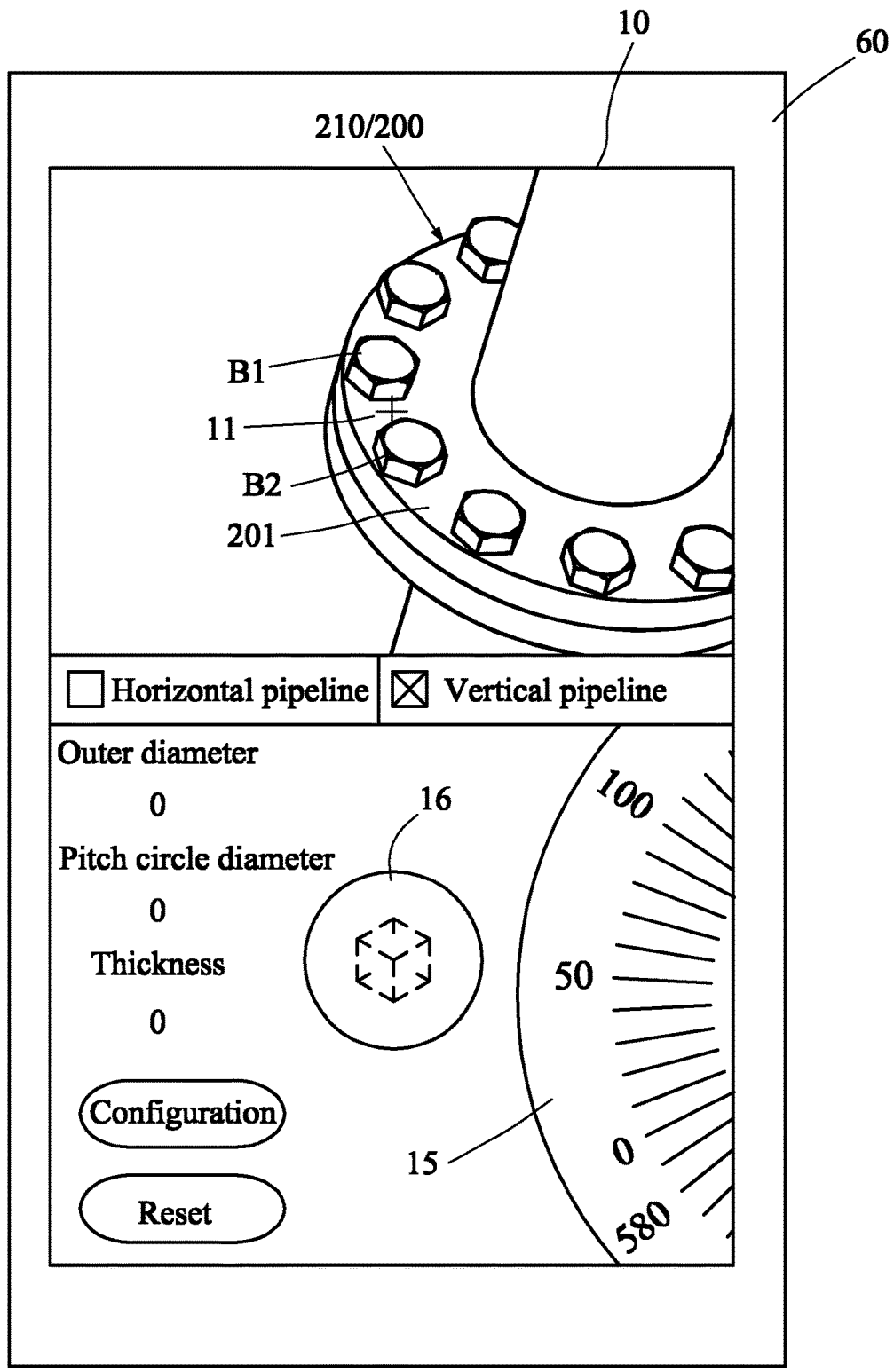
Figure 7:
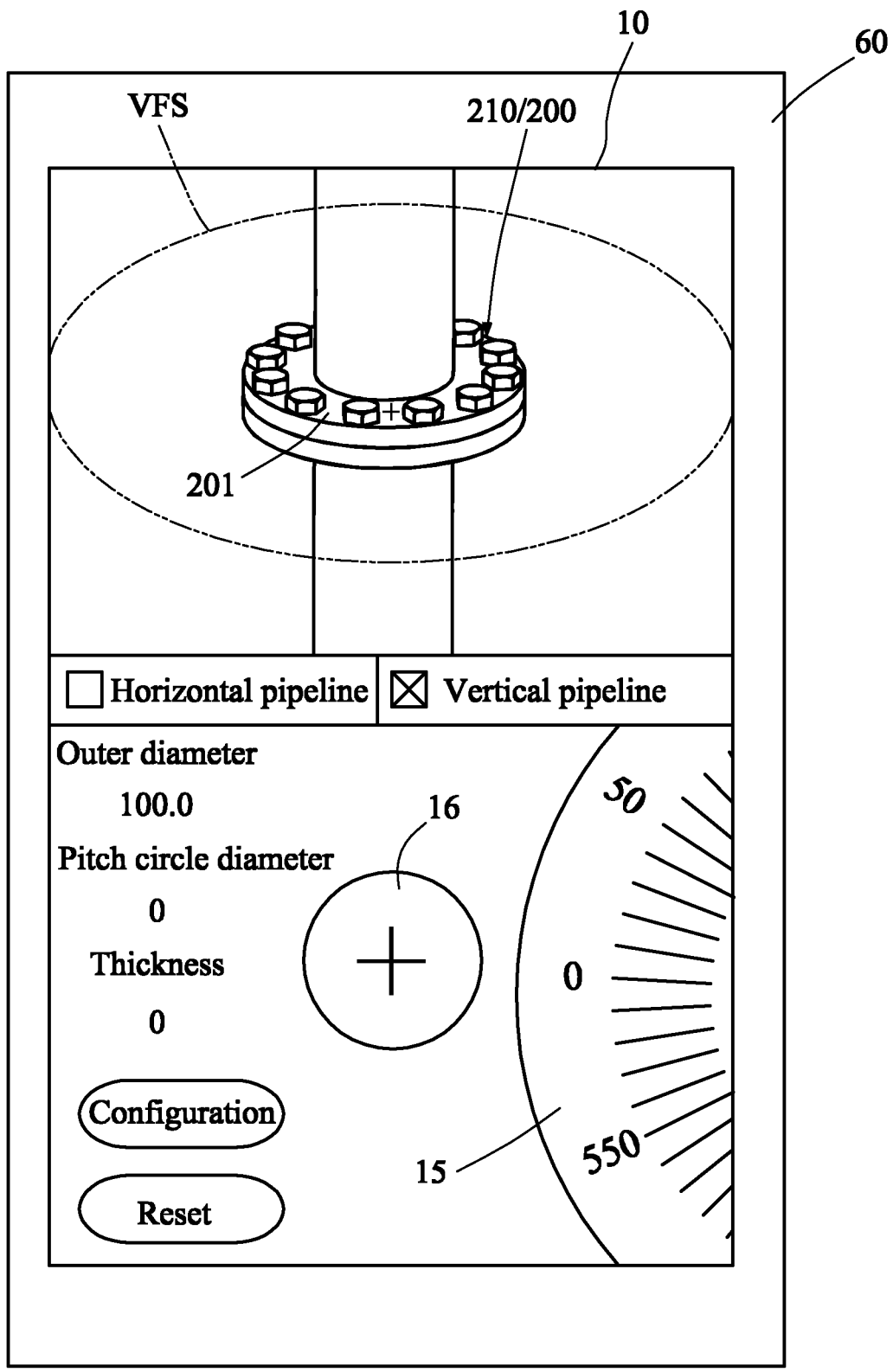

As a result, the operator is able to operate the camera 70 of the electronic device 100 to stably keep the first center mark 11 in an area between the two bolts B1 and B2, and move the camera 70 around the flange in each orientation to collect plane feature point information at the different viewing angles (see FIGS. 4 to 6). This step enables the electronic device 100 to detect the real environment, to collect associated depth information, and thus to regress a plane in the space. After the plane feature point information has been collected, the operator presses the execution button 16 on the first interface 10, and a virtual flange surface VFS (FIG. 7) is created and displayed on the first interface 10.

Figure 8:
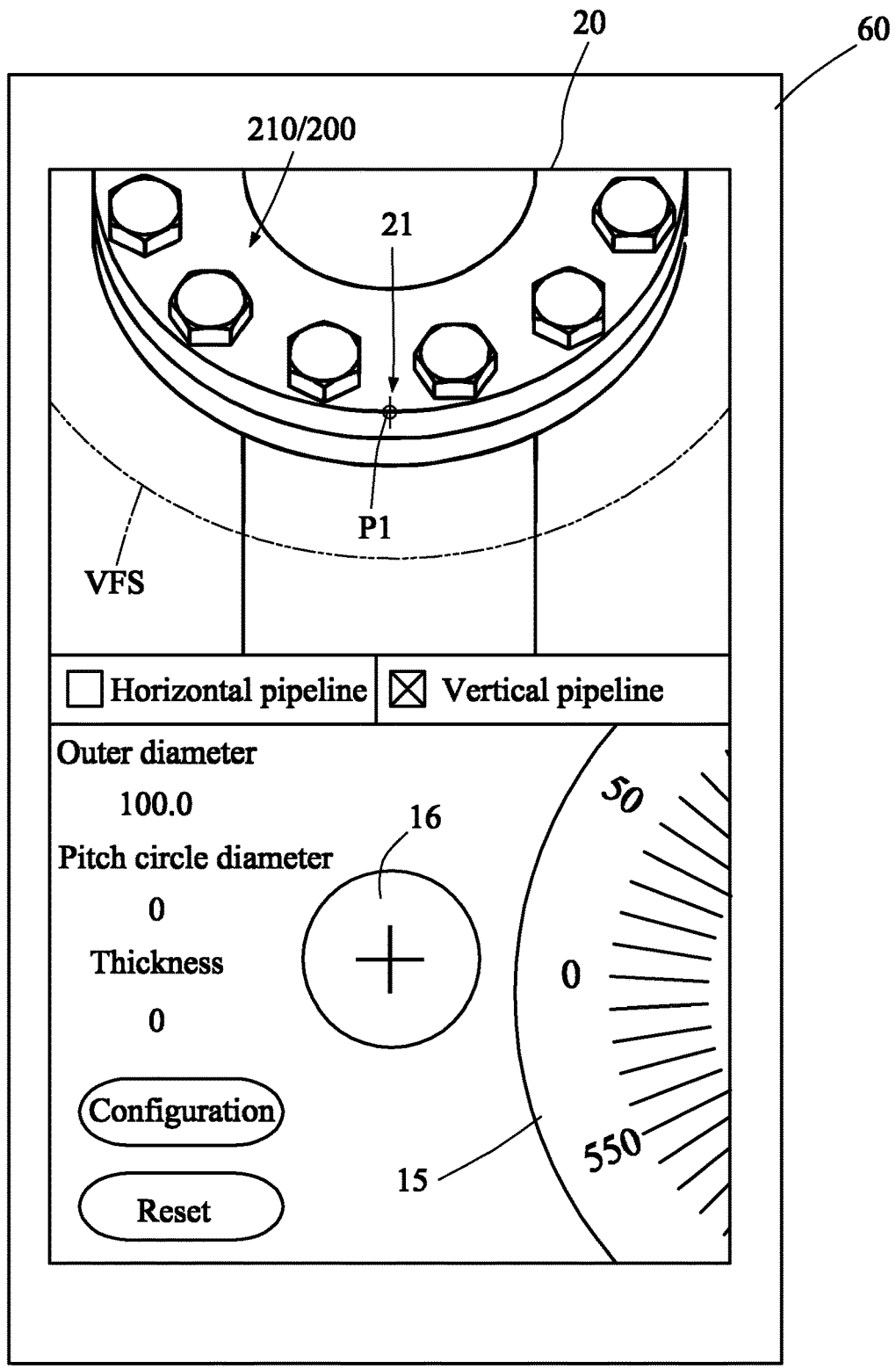
Figure 9:
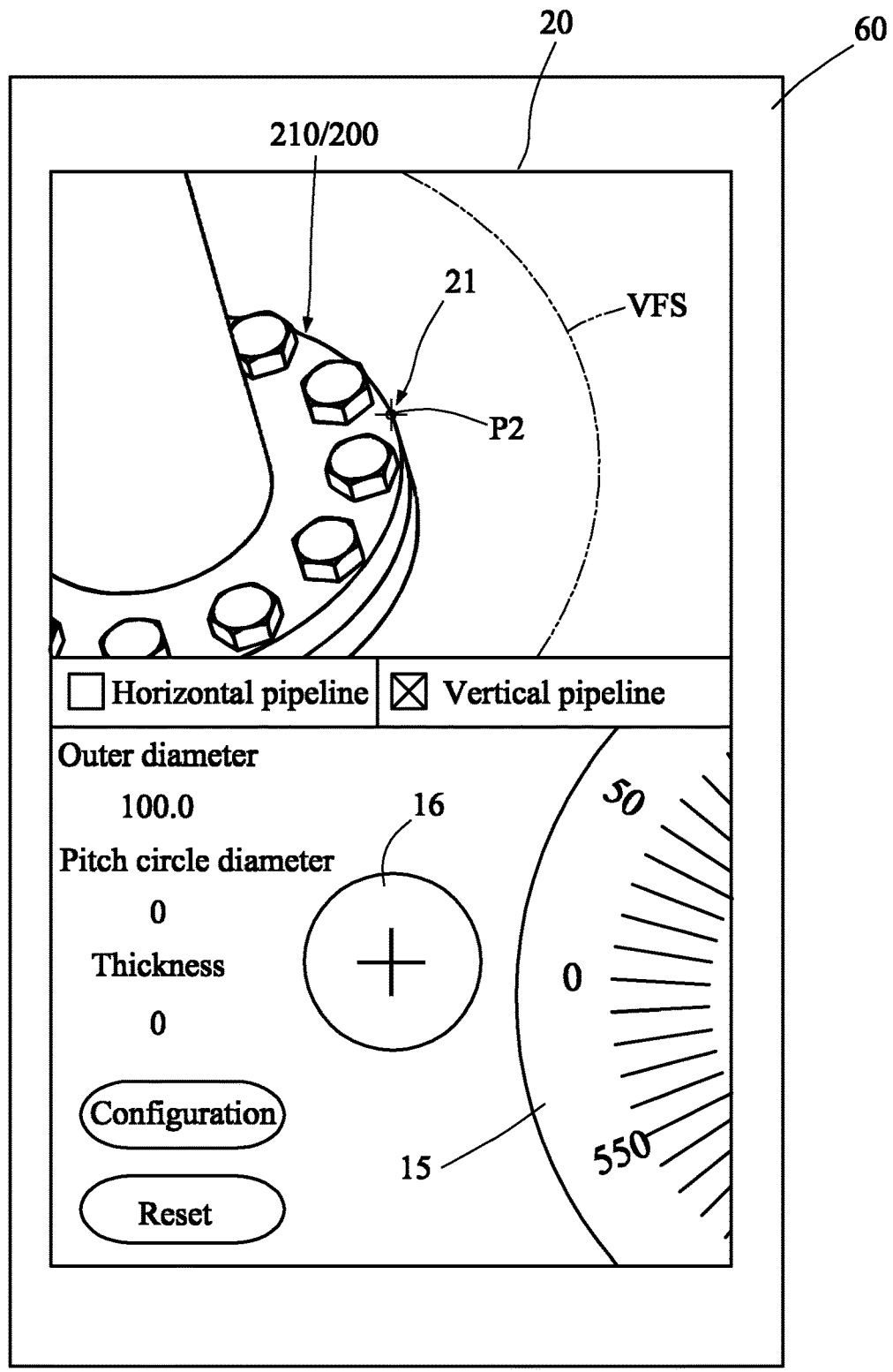
Figure 10:
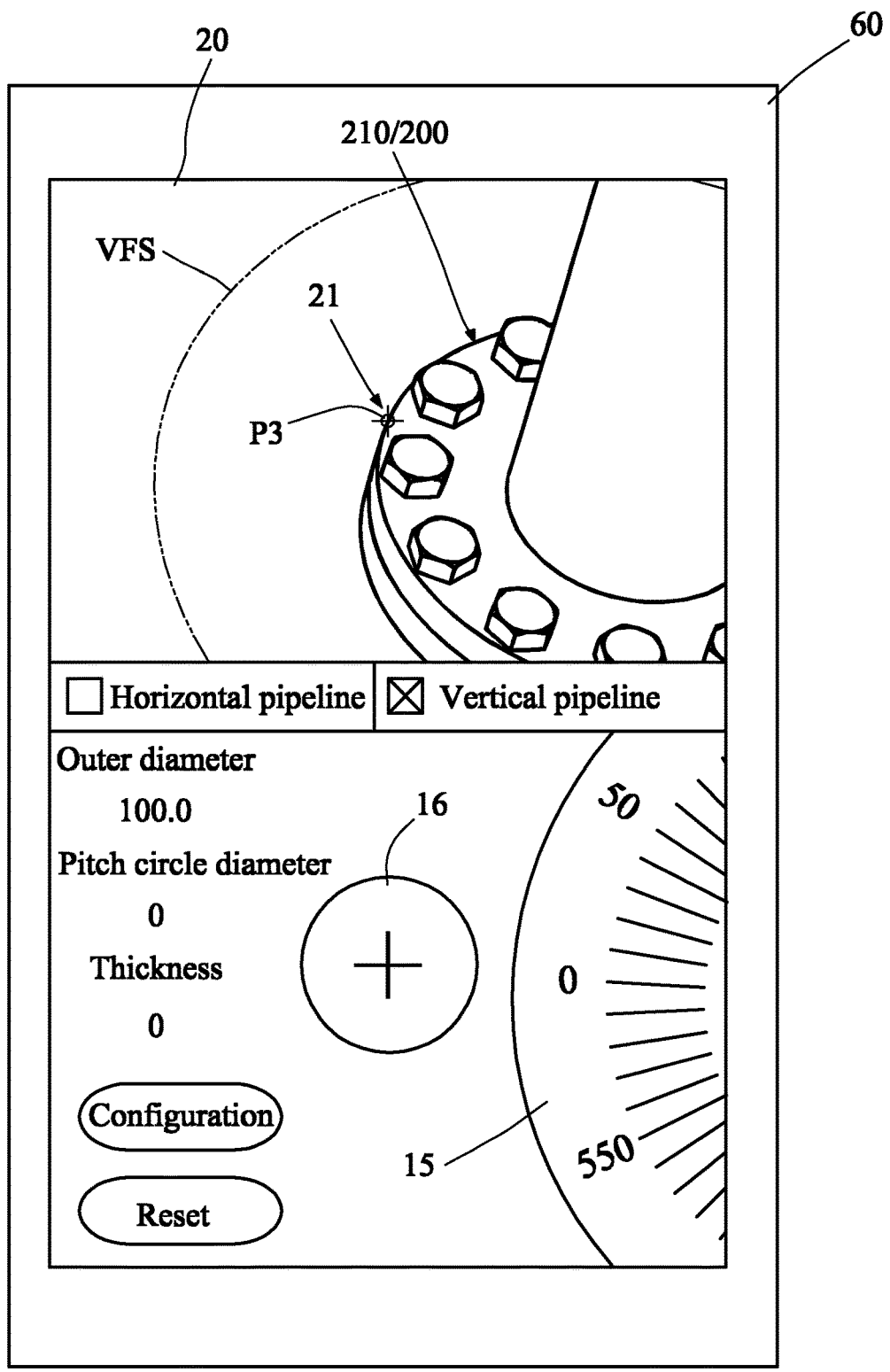
Figure 11:
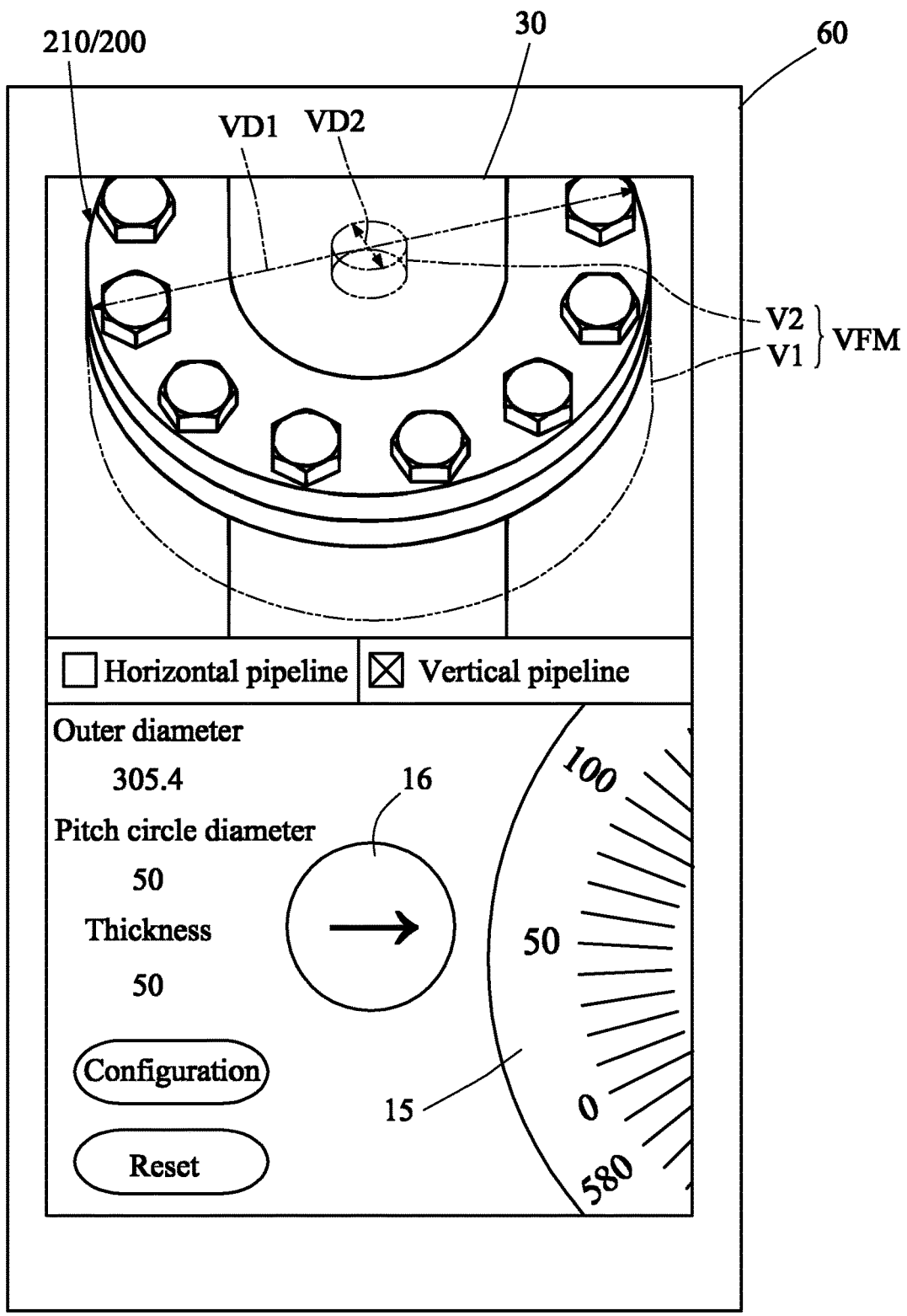

In the circumferential point picking step S2, the camera 70 is kept continuously enabled, and the CPU 80 provides the virtual flange surface VFS and the real-time image 210 superimposed on a second interface 20 of the display 60, as shown in FIG. 8, to allow the operator to pick three circumferential points P1, P2 and P3 (FIGS. 8 to 10) corresponding to the flange 200 through the second interface 20. Accordingly, the CPU 80 determines a virtual outer diameter VD1 according to the three circumferential points P1, P2 and P3 to create a virtual flange model VFM having a virtual outer diameter VD1 and a virtual pitch circle diameter VD2, as shown in FIG. 11. Because the determination of one circle according to three points defining one plane can be easily conducted according to the well know mathematical logic, those skilled in the art can easily implement this embodiment, and detailed descriptions thereof will be omitted. As shown in FIG. 11, the provided virtual flange model VFM includes a large cylinder V1 and a small cylinder V2 stacked together, wherein the large cylinder V1 has the virtual outer diameter VD1, and the small cylinder V2 has the virtual pitch circle diameter VD2.

In a non-restrictive example, the second interface 20 has a second center mark 21 for guiding the operator to operate the electronic device 100 to align the second center mark 21 with each of three circumferential points P1, P2 and P3 of the flange 200, wherein the three circumferential points P1, P2 and P3 and the virtual flange surface VFS are located on substantially the same plane.

Therefore, the operator presses the execution button 16 to pick each of the three circumferential points with the second center mark 21 on the second interface 20 being aligned with the corresponding circumferential point on the virtual flange surface VFS and the real-time image 210 of the flange, and the projected outer diameter of the virtual flange model can be determined as 305.4 mm in this example.

Figure 12:
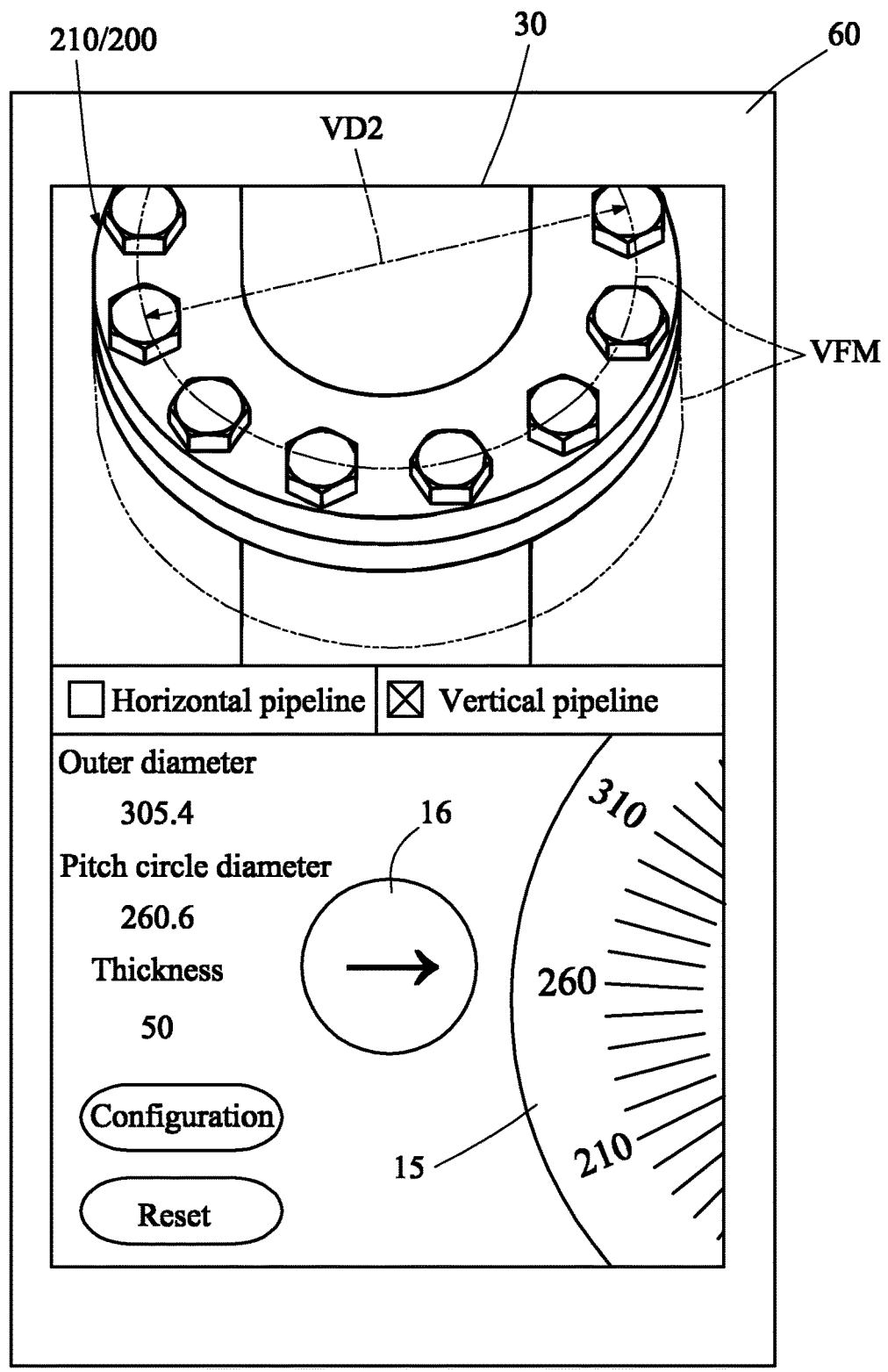

In the pitch-circle-diameter adjusting step S3, a third interface 30, on which the virtual flange model VFM and the real-time image 210 are superimposed, is provided, as shown in FIG. 11, to allow the operator to adjust the virtual pitch circle diameter VD2 of the virtual flange model VFM through the third interface 30. Optionally, the virtual flange model VFM can be immediately updated according to the operator's adjustments, as shown in FIG. 12. For example, the user is able to adjust the virtual pitch circle diameter VD2 to 260.6 mm to match with the obtained real-time image 210 through the scroll wheel 15, and confirm the adjustment result through the execution button 16. It is worth noting that when the pitch circle diameter is being adjusted, the small cylinder V2 can be adjusted to make the center points of the bolts or bolt holes be located on the circumference of the bottom surface of the small cylinder V2, and the projected pitch circle diameter of the virtual flange model VFM can be determined.

Figure 13:
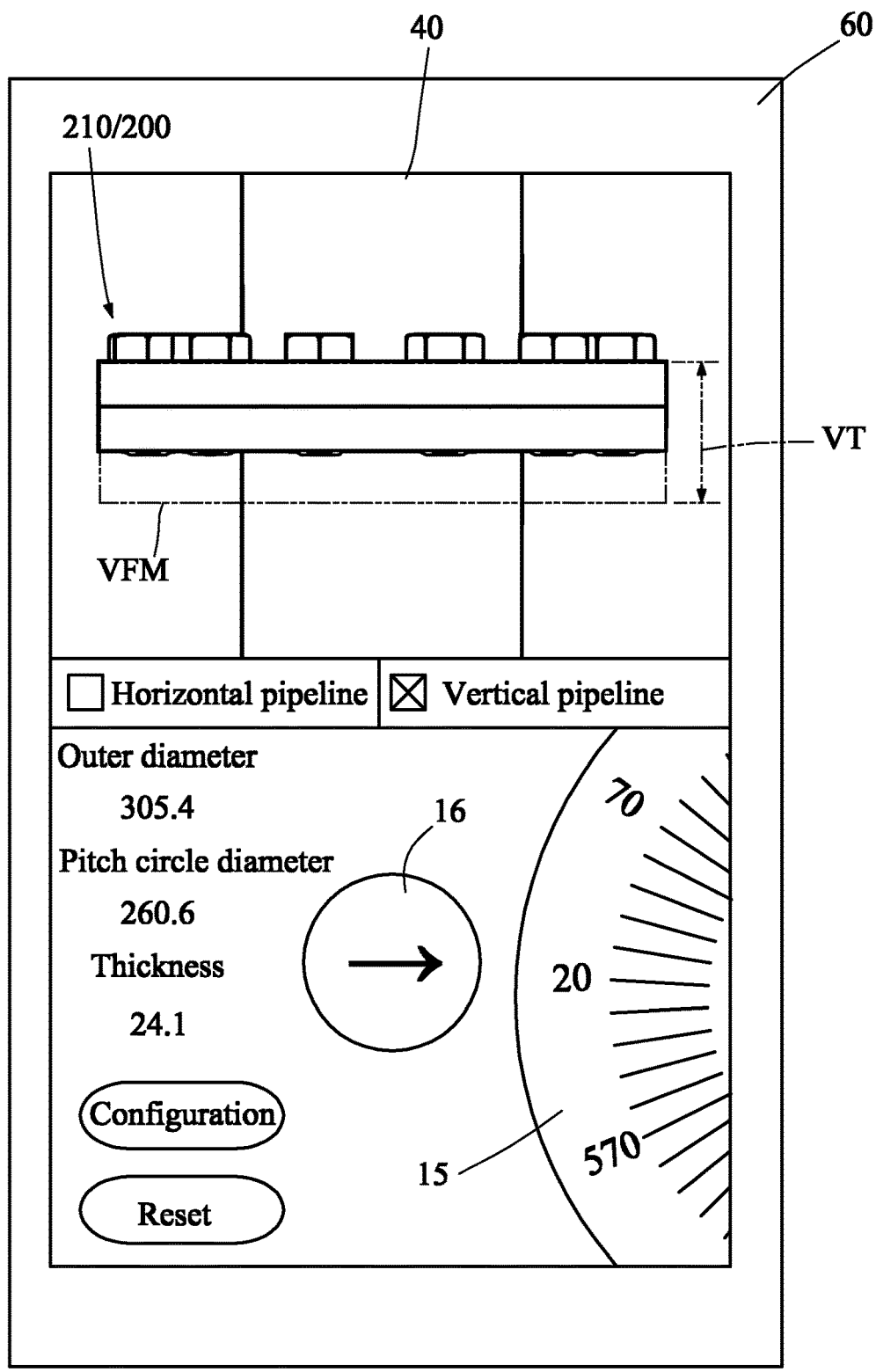
Figure 14:
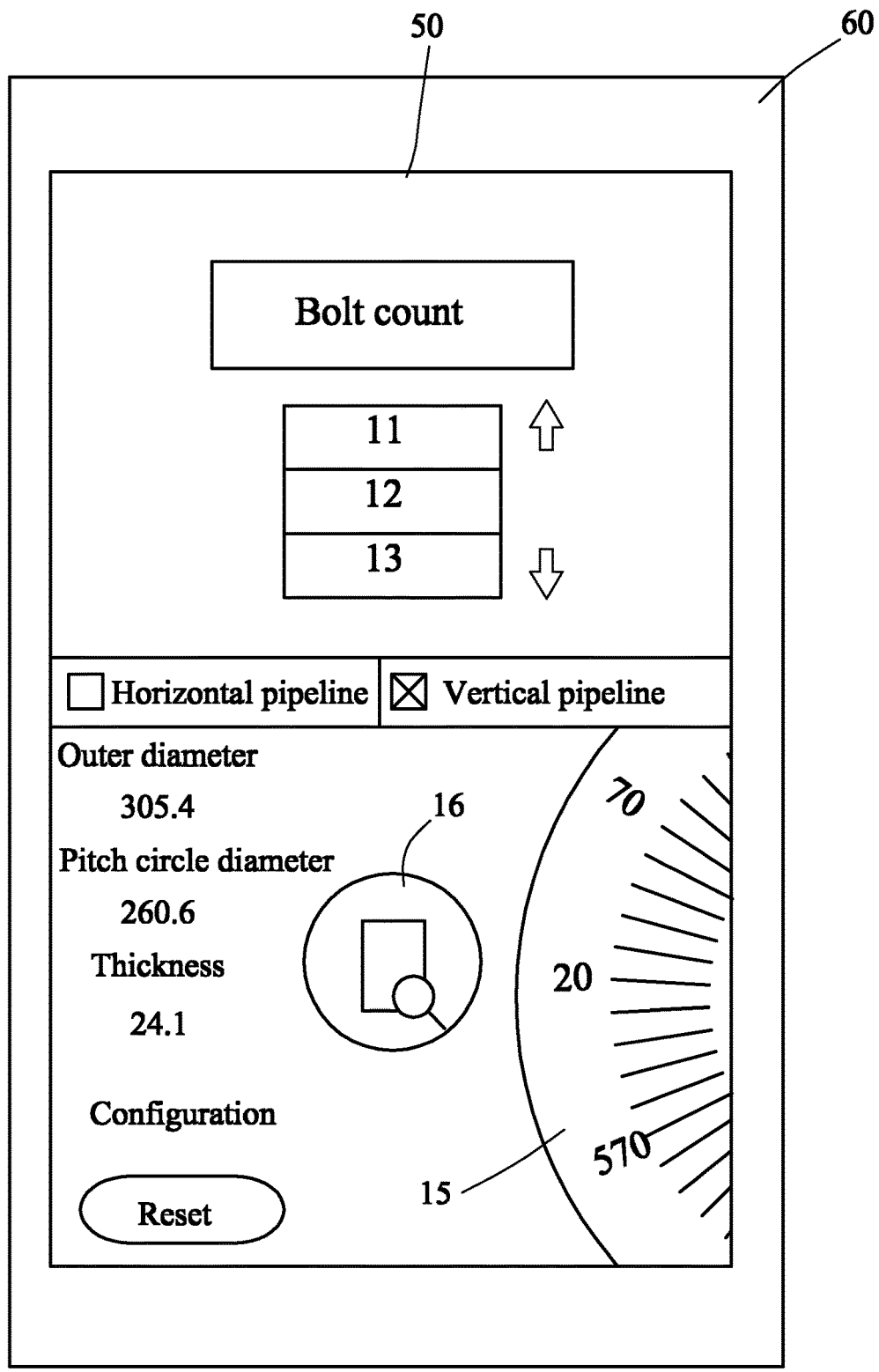

In the flange thickness adjusting step S4, the operator is able to adjust the thickness from a side view of the flange. The CPU 80 works with the camera 70 and the display 60 to provide a fourth interface 40, on which the virtual flange model VFM and the real-time image 210 are superimposed, to allow the operator to adjust a virtual thickness VT of the virtual flange model VFM through the fourth interface 40. Optionally, the virtual flange model VFM can be updated immediately according to the operator's adjustments, as shown in FIG. 13. For example, the operator is able to adjust the thickness to 24.1 mm to match with the obtained real-time image 210 through the scroll wheel 15, and confirm the adjustment result through the execution button 16 to determine the projected thickness of the virtual flange model VFM. It is worth noting that the first interface 10, the second interface 20, the third interface 30 and the fourth interface 40 are AR interfaces.

In the bolt count inputting step S5, a fifth interface 50, through which the operator inputs a count of bolts, is provided. For example, the user selects the count of bolts to be 12 through a slide operation on the fifth interface 50. It is worth noting that the orders of steps S4 and S5 can be arbitrarily adjusted and are not particularly restricted. For example, the steps S4 and S5 can be performed first before the searching step S6.

Figure 15:
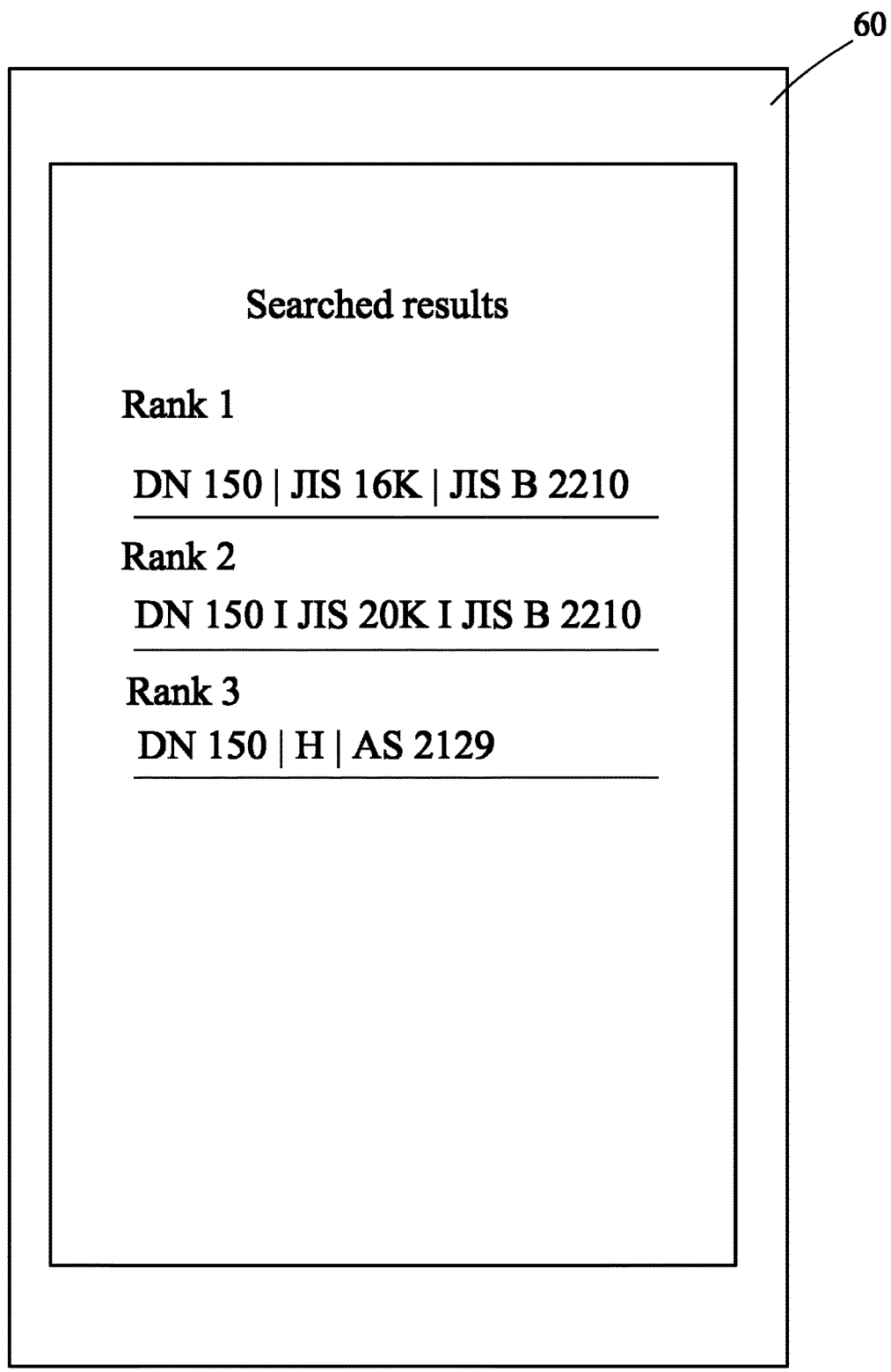
FIG. 15 shows searched results providing by the identifying method of FIG. 2.

In the searching step S6, after the count of bolts has been selected as 12, the operator presses the execution button 16 to perform searching. The CPU 80 searches the database 90 according to the virtual outer diameter VD1, the virtual pitch circle diameter VD2 and the virtual thickness VT of the virtual flange model VFM to obtain one or multiple searched results of physical flanges matching with the virtual flange model VFM, as shown in FIG. 15, wherein the searched results are ranked based on matching scores.

In the saving step S7, the CPU 80 saves one or multiple ones of the real-time images 210 of the flange 200 and the one or multiple searched results into the database 90, so that additional reference data may be provided for the next searching.

It is worth noting that although the mobile phone functions as one example of the electronic device 100, a wearable device may also be used. The wearable device may enable the operator to perform selecting and adjusting by tracking the eyeball or head of the operator, and the same effect can be achieved.

With the method of identifying the flange specification based on the AR interface of the embodiments, the AR interface can be used in conjunction with human spatial reasoning to provide the instructional information after image processing to determine the three dimensional parameters including an outer diameter, a pitch circle diameter and a thickness of the flange. Then, database searching is automatically performed according to the parameters to find the matched specifications of the flanges without the steps of disassembling and measuring the flange. This disclosure is able to determine the corresponding specifications from the database automatically based on only four most discriminative parameters of the flange including the outer diameter, the pitch circle diameter, the thickness, and the bolt count.

While this disclosure has been described by way of examples and in terms of preferred embodiments, it is to be understood that this disclosure is not limited thereto. To the contrary, it is intended to cover various modifications. Therefore, the scope of the appended claims should be accorded the broadest interpretation so as to encompass all such modifications.

What is claimed is:

1. A method of identifying a flange specification based on an augmented reality interface applied to an electronic device, the method comprising:
   an environment depth creating step of providing a first interface representing each of real-time images of a flange to allow an operator to select the real-time images of the flange to be processed at different viewing angles through the first interface, obtaining multiple sets of plane feature point information according to the real-time images, and creating a virtual flange surface according to the multiple sets of plane feature point information;
   a circumferential point picking step of providing a second interface, on which the virtual flange surface and each of the real-time images are superimposed, to allow the operator to pick three circumferential points corresponding to the flange through the second interface, determining a virtual outer diameter according to the three circumferential points located on a plane substantially the same as the virtual flange surface, and creating a virtual flange model having the virtual outer diameter and a virtual pitch circle diameter;
   a pitch-circle-diameter adjusting step of providing a third interface, on which the virtual flange model and each of the real-time images are superimposed, to allow the operator to adjust the virtual pitch circle diameter of the virtual flange model through the third interface;
   a flange thickness adjusting step of providing a fourth interface, on which the virtual flange model and each of the real-time images are superimposed, to allow the operator to adjust a virtual thickness of the virtual flange model through the fourth interface;
   a bolt count inputting step of providing a fifth interface, through which the operator inputs a count of bolts; and
   a searching step of searching a database according to the virtual outer diameter, the virtual pitch circle diameter and the virtual thickness of the virtual flange model, and obtaining one or multiple searched results of physical flanges matching with the virtual flange model.

2. The method of identifying the flange specification based on the augmented reality interface according to claim 1, further comprising:
   a saving step of saving one or multiple ones of the real-time images of the flange and the one or multiple searched results into the database, wherein in the pitch-circle-diameter adjusting step and the flange thickness adjusting step, the virtual flange model is immediately updated according to adjusting of the operator.

3. The method of identifying the flange specification based on the augmented reality interface according to claim 1, wherein the first interface guides the operator to operate the electronic device to photograph the flange while moving the electronic device around the flange in three orientations to obtain the real-time images at the different viewing angles.

4. The method of identifying the flange specification based on the augmented reality interface according to claim 3, wherein the first interface has a first center mark for guiding the operator to operate the electronic device to photograph the flange while moving the electronic device around the flange in the three orientations comprising upward, rightward and leftward orientations and keeping the first center mark on a top surface of the flange to obtain the real-time images at the different viewing angles to enable the electronic device to detect a real environment, to collect associated depth information, and thus to regress the plane in a space.

5. The method of identifying the flange specification based on the augmented reality interface according to claim 4, wherein the first interface guides the operator to keep the first center mark at a position between two of the bolts.

6. The method of identifying the flange specification based on the augmented reality interface according to claim 1, wherein the second interface has a second center mark for guiding the operator to operate the electronic device to align the second center mark with each of the three circumferential points of the flange.

7. The method of identifying the flange specification based on the augmented reality interface according to claim 1, wherein the first interface provides a horizontal pipeline option and a vertical pipeline option.

8. The method of identifying the flange specification based on the augmented reality interface according to claim 1, wherein the searched results are ranked based on matching scores.

9. The method of identifying the flange specification based on the augmented reality interface according to claim 1, wherein in the third interface, the virtual flange model comprises a large cylinder and a small cylinder stacked together, wherein the large cylinder has the virtual outer diameter, and the small cylinder has the virtual pitch circle diameter.

10. The method of identifying the flange specification based on the augmented reality interface according to claim 1, wherein the electronic device enables the operator to perform picking and adjusting by tracking an eyeball or a head of the operator.

11. The method of identifying the flange specification based on the augmented reality interface according to claim 9, wherein when the virtual pitch circle diameter is being adjusted, the small cylinder is adjusted to make center points of the bolts or bolt holes be located on a circumference of a bottom surface of the small cylinder, and a projected pitch circle diameter of the virtual flange model is determined.

12. The method of identifying the flange specification based on the augmented reality interface according to claim 1, wherein the virtual flange surface is displayed on the first interface.

13. The method of identifying the flange specification based on the augmented reality interface according to claim 1, wherein the three circumferential points are picked before the virtual flange model is created.

14. The method of identifying the flange specification based on the augmented reality interface according to claim 1, wherein the virtual flange surface and a top surface of the flange are located on substantially a same plane on the first interface.

15. The method of identifying the flange specification based on the augmented reality interface according to claim 1, wherein the virtual flange surface is created before the virtual flange model is created.

* * * * *